Richardson

[54] HOROLOGICAL INSTRUMENT INCORPORATING MEANS FOR ILLUMINATING A LIQUID CRYSTAL DISPLAY

[76] Inventor: Kenneth J. Richardson, Hudson, Ohio
[73] Assignee: Hoffman-La Roche Inc., Nutley, N.J.
[22] Filed: Nov. 14, 1973
[21] Appl. No.: 415,735

[52] U.S. Cl. .................... 58/50 R, 240/6.43
[51] Int. Cl. ............... G04b 19/30, G04c 17/02
[58] Field of Search ............ 58/50 R; 240/6.43

[56] References Cited
UNITED STATES PATENTS

| | | | |
|---|---|---|---|
| 3,514,940 | 6/1970 | Keane, Jr. et al. | 58/50 R |
| 3,574,993 | 4/1971 | Black | 58/50 R |
| 3,701,249 | 10/1972 | Bergey et al. | 58/ |
| 3,712,047 | 1/1973 | Girard | 58/ |
| 3,747,322 | 7/1973 | Eckenrode | 58/ |

*Primary Examiner*—Edith Simmons Jackmon
*Attorney, Agent, or Firm*—Samuel L. Welt; Bern S. Leon; Mark L. Hopkins

[57] ABSTRACT

A liquid crystal horological instrument employi display comprising a layer of liquid crystal mat sandwiched between transparent parallel plates incorporating a reflective surface on the side of display opposite that side which is viewed by an server. Electrical lamp means are incorporated the horological instrument for evenly illuminating display in the absence of ambient light. The l means is powered by the same battery as that use power the display and the driving circuitry therefo

9 Claims, 8 Drawing Figures

PATENTED FEB 11 1975 3,864,905

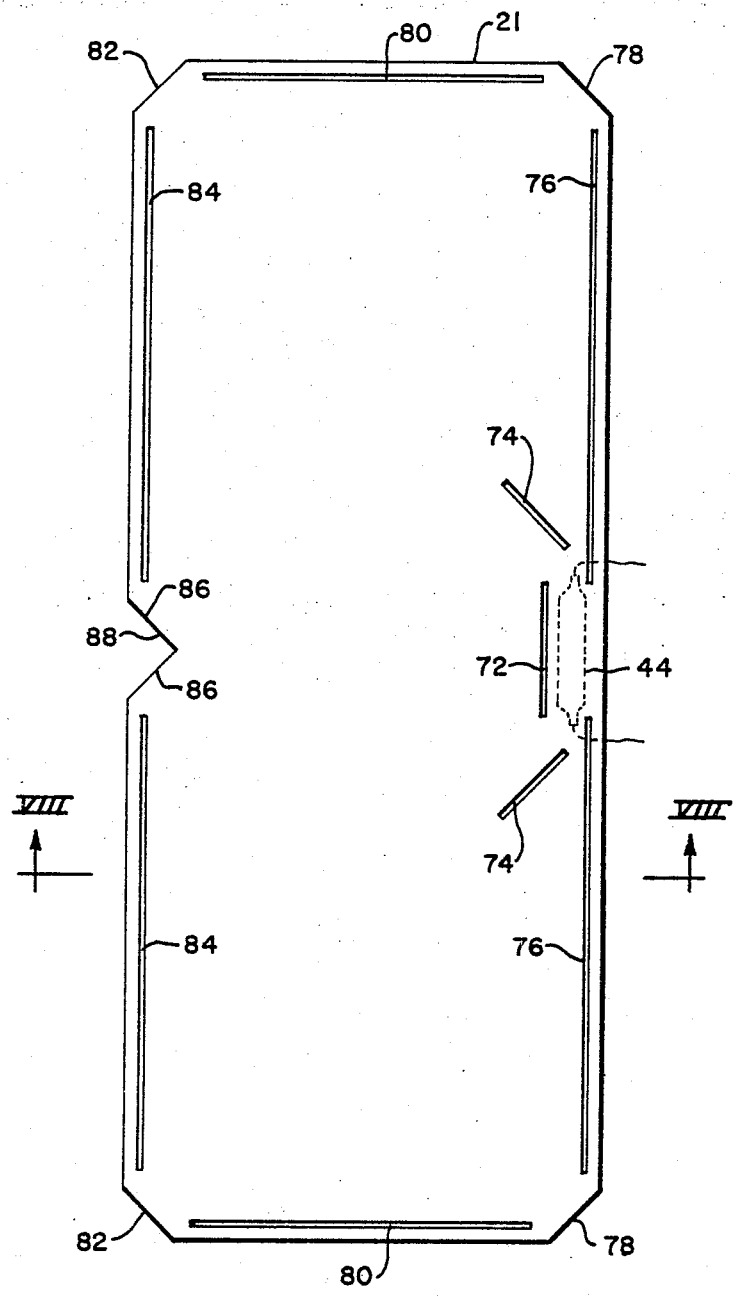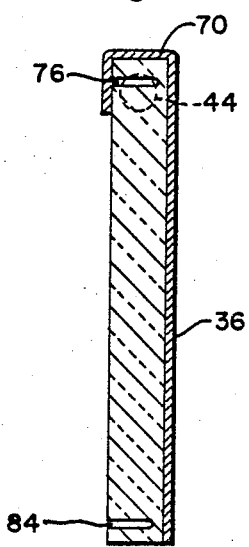

HOROLOGICAL INSTRUMENT INCORPORATING MEANS FOR ILLUMINATING A LIQUID CRYSTAL DISPLAY

BACKGROUND OF THE INVENTION

As is known, electronic watches which employ no moving parts and which incorporate electro-optic displays are now well known. In such watches, a frequency standard in the form of a crystal oscillator acts through solid-state electronic circuit dividers and drivers to power the electro-optic display. Preferably, the electro-optic display is of the liquid crystal type because of its low power consumption. Such a display comprises: (1) a layer of liquid crystal material disposed between first and second transparent plates, (2) transparent conductive material on the plates adapted to form numerals, and (3), in the case of field effect liquid crystal displays, polarizers on opposite sides of the layer of liquid crystal material to provide a sandwich structure through which light can pass. By establishing a potential difference between selected conductive film areas on the respective plates, some areas of the sandwich structure will transmit light while others will not to thereby form the numerals indicating the time of day. A reflector assembly is provided adjacent the display on the side thereof opposite that viewed by an observer and is adapted to reflect ambient light which passes through the liquid crystal material back through the sandwich structure. Thus, the display can be viewed under ambient light conditions without requiring light emitting devices such as light emitting diodes which necessitate a relatively high power supply source, an obvious disadvantage in watches which must be powered by batteries of limited size.

While liquid crystal watches, and for that matter any watch, can be easily viewed under ambient light, conditions arise where it is not possible to view the watch because of darkness. A typical example are the conditions existing within an automobile during night driving. Normally, it is necessary to switch on the dome light of the automobile in order to view the watch. It is, of course, highly desirable to provide some way of illuminating a liquid crystal watch display without the necessity for an external source of light. At the same time, because of space limitations and the power available from the watch battery, a very small point light source must be employed. This requires a means for dispersing the light from the point source across the entire area of the reflecting surface of the liquid crystal display.

SUMMARY OF THE INVENTION

In accordance with the present invention, a horological instrument is provided incorporating a display comprising a layer of liquid crystal material sandwiched between transparent parallel plates and having transparent conductive patches on the plates adapted to form numerals when a source of potential is applied across selected ones of the patches. Light reflective means is provided on the side of the display opposite that which is viewed by an observer. Electric lamp means, typically rated at 1 ½ volts and 16 milliampers, is positioned adjacent an edge of the display. Preferably, it is adjacent the edge of a plexiglas plate interposed between the light reflective means and the rear transparent plate forming the display. Because of size limitations and other factors, the lamp means, preferably an incandescent lamp, must be relatively short in order to minimize the length of the filament therein. If a tempt is made to simply position a small light sour this type adjacent the display intermediate its only the central portion of the display will be ill nated. Accordingly, means are provided in accord with the invention for dispersing the light from point source throughout the entire area of the plex plate and, therefore, the entire area of the display. erably, this comprises notches or grooves formed i plexiglas plate which will reflect light and direct it angles from the point source.

Further, in accordance with the invention, powe the incandescent lamp is provided by the same ba which drives the liquid crystal display and the circ connected thereto. As a result, only a single batte required for both the lamp and the watch circuitr self. Although the lamp will create a current drai the battery, pushbutton switch means is provided w project through the watch casing in order that it ca depressed to illuminate the liquid crystal display when it is being observed, thereby minimizing the rent drain on the battery.

The above and other objects and features of th vention will become apparent from the following tailed description taken in connection with the ac panying drawings which form a part of this speci tion, and in which:

FIG. 7 illustrates still another embodiment of th vention wherein light is dispersed by means of al nized grooves formed in a plexiglas plate and for light pipes; and FIG. 8 is a cross-sectional view taken along line —VIII of FIG. 7.

Figure 1:
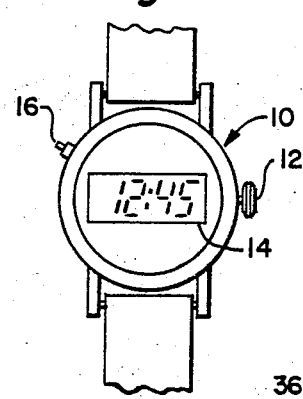
FIG. 1 is a schematic illustration of a liquid cr watch employing the illuminating means of the in tion.

With reference now to the drawings, and particu to FIG. 1, a solid-state electronic watch 10 is sh having a crown 12 connected to a stem for settin time on the watch in accordance with well-known niques. The watch incorporates solid-state cou circuitry as will hereinafter be described. It has c face a liquid crystal display, generally indicated b reference numeral 14, which indicates the time of Also provided in the casing for the watch 10 is a p button switch 16 which can be used to selectively gize the illuminating means of the invention.

Figure 2:
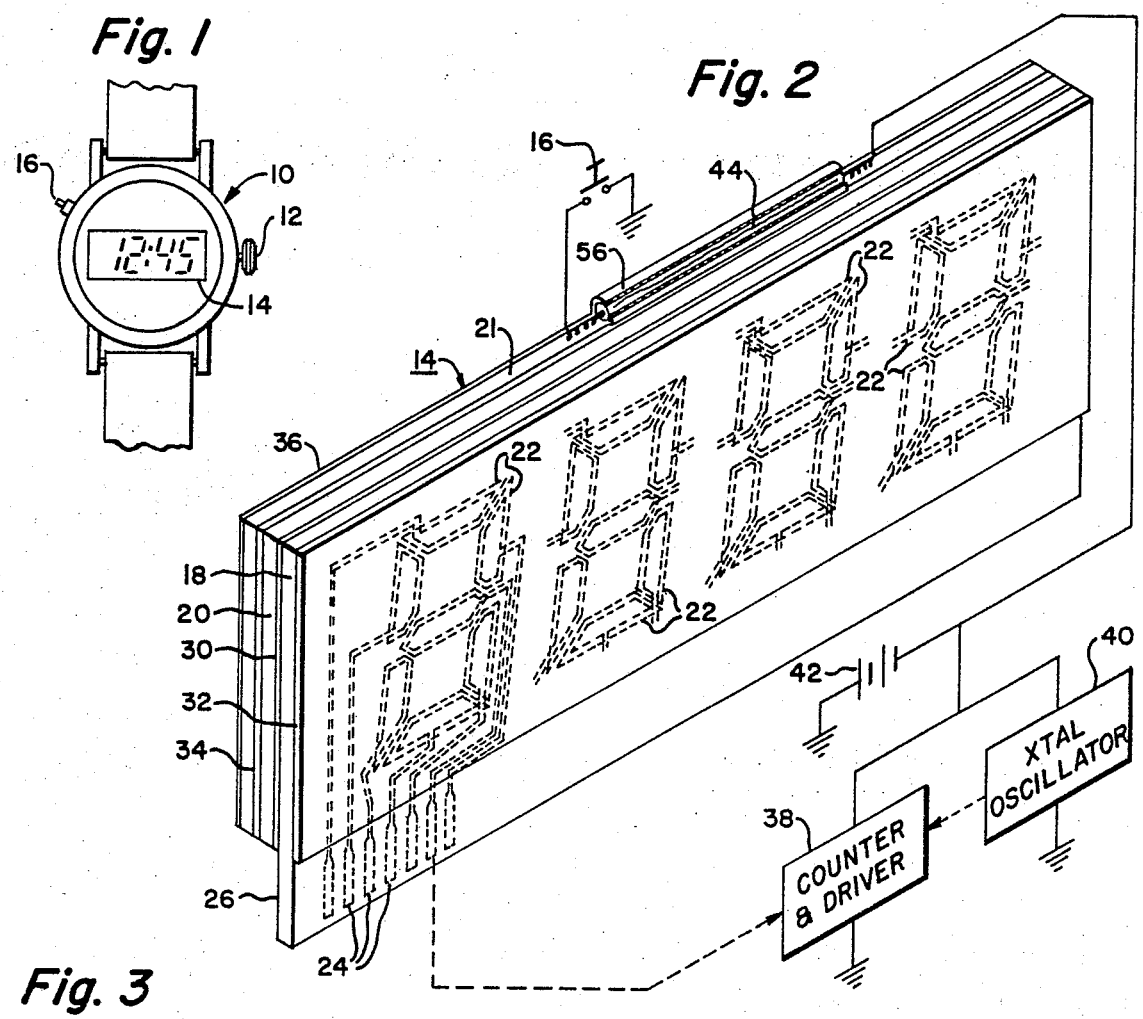
FIG. 2 is a perspective view of the liquid crysta play utilized in the watch of FIG. 1, showing the ill nating means of the invention together with the cr oscillator and driving circuitry for the liquid crysta play.
Figure 3:
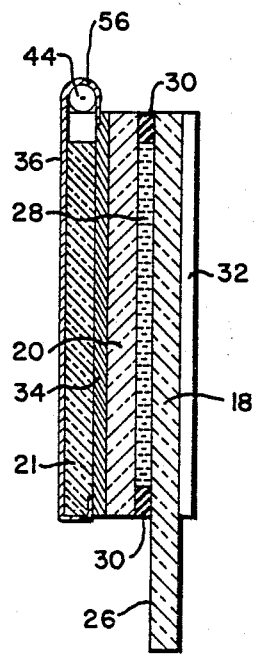
FIG. 3 is a cross-sectional view of the display sh in FIG. 1.

In FIGS. 2 and 3, the liquid crystal display shown in detail. It comprises a pair of spaced flat p of glass or other similar transparent material 18 an Provided on the facing surfaces of the transp plates 18 and 20 are coatings of transparent conductive material between which an electrical field may be formed. The coatings are not shown in FIG. 3; however in FIG. 2, they are shown as strips 22 arranged in the form of a FIG. "8" on the inside surface of the front transparent plate 18. A patch of transparent electrically conductive material is deposited on plate 20 behind each one of the figures shown in FIG. 2 as is more fully described in U.S. Pat. No. 3,731,986. Each of the strips 22 is connected through an associated lead 24 to an extension 26 of the plate 18 which extends below the remainder of the liquid crystal display. The transparent conductive strips on the extension 26 are adapted for connection to an electrical connector, not shown. Between the transparent plates 18 and 20, or more particularly between the transparent electrically conductive coatings thereon, is a layer of liquid crystal material 28 (FIG. 3). The liquid crystal material 28 is nematic at room temperature and is of positive dielectric anisotropy as is more fully described in the aforesaid U.S. Pat. No. 3,731,986. Surrounding the layer of liquid crystal material is a suitable gasket 30 which may comprise a thermosetting resin. On the outer surfaces of the transparent plates 18 and 20 are crossed polarizers or polarizing films 32 and 34. It should be understood, however, that the polarizers 32 and 34 can be on the inner facing surfaces of the transparent plates covering the transparent conductive films thereon and may, for instance, comprise polarizing dichroic films.

In the construction of the liquid crystal display, the surfaces in contact with the liquid crystal display are rubbed unidirectionally at right angles to each other in order to effect a twisted nematic structure as is more fully described in U.S. Pat. No. 3,371,986. A surface treatment agent such as that described in copending application Ser. No. 395,571, filed Sept. 10, 1973 may be provided over the electrically conductive coatings in order to effect better-defined lines of rubbing. Such a treating agent may, for example, comprise polyvinyl alcohol, polyethylene oxide, polyvinyl pyrrolidone, polyvinyl butyral, polyvinyl formal, polyvinyl glyoxal or polyvinyl glutral.

It is known that the molecules in a nematic-phase liquid crystal material are each long and straight, and they tend to lie parallel, like straws in a broom. A property of the nematic-phase material is that the molecules in the vicinity of a rubbed surface tend to align themselves with it. The molecules nearest the plate 18 are thus inclined to orient themselves parallel to the rubbed lines on it; and those nearest the plate 20 are inclined to orient themselves parallel to the lines thereon, or at right angles to the orientation adjacent plate 18. The structural orientation of the molecules in-between the rubbed lines on the plates 18 and 20 is then twisted with no potential applied between the aforesaid transparent conductive films.

The effect of the liquid crystal unit on polarized light directed through the plates 18 and 20 and polarized parallel to the rubbed lines on plate 18, for example, is that the unit effects a rotation of the plane of polarization of the light as it passes therethrough. In this manner, the light emanating from the surface of the plate 18 is parallel to the rubbed lines thereon. As this polarized light passes through the liquid crystal layer 28, it is rotated through 90° and then passes through plate 20 and the rear polarizer 34 which is crossed with respect to the front polarizer. After passing through the rear polarizer 34, it passes through a transparent plexiglas plate 21 and strikes a reflecting surface 36 which acts to scatter the polarized light without depolarizing the same. The polarized light then passes through plate 21 and the rear polarizer 34, is again rotated through 90° in passing through the liquid crystal layer 28, and passes through the front polarizer 32.

Now, if an electrical potential is applied between the conductive material on the front plate 18 and that on the rear plate 20, the nematic structure of the liquid crystal layer will no longer be twisted, and will not rotate the plane of polarized light through 90°. As a result, light cannot pass through both the rear and front polarizers, and the area of the energized conducting films appears dark or opaque. In this manner, it will be appreciated that by applying a potential between selected ones of the strips 22 on the front plate 18 and a conductive patch on the rear plate, any numeral from 1 through 0 can be made to appear at the digit positions shown in FIG. 2.

The various conductive leads 24 shown in FIG. 2 are connected through appropriate circuitry to a counter and driving circuitry 38, which usually takes the form of an integrated circuit within the watch casing 10. The counter, in turn, is connected to a crystal oscillator 40, the two units being driven by the same battery 42. The oscillator 40 produces precisely timed pulses which are counted down in counter 38. The output of the counter is then applied through driver logic circuits are utilized to energize selected ones of the strips 22 in the display 14 such that the digit farthest to the right in FIG. 2 will change each minute, that next to it will change every ten minutes, that next to it will change every hour, and so on.

As thus far described, the numerals appearing on the display 14 are visible by virtue of the fact that ambient light will pass through the front polarizer 32 and can be reflected from the reflecting surface 36. Of course, as is the case with any watch, it is not ordinarily possible to view the face of the watch in the absence of ambient light. In accordance with the present invention, therefore, means are provided for selectively illuminating the area behind the liquid crystal display 14, and particularly the plexiglas plate 21, such that light may be reflected from reflecting surface 36 out through the front plate 18 where it may be viewed in the dark by an observer. The means for illuminating the display comprises a small incandescent lamp having a diameter of about 0.022 inch and a rating of 1.5 volts and 16 milliamperes. A lamp of this sort, in order to minimize its filament length, may be relatively short, on the order of 1/16 inch. A problem, therefore, arises in evenly distributing the light from the lamp 44 across the entire face of the display 14 shown in FIG. 1. Note that the lamp 44, as shown in FIG. 2, is energized by depressing a pushbutton 16; and is energized from the same battery 42 which powers the crystal oscillator and the driving and counting circuitry 38. Since the pushbutton 16 will be depressed only momentarily in normal usage, very little drain on the battery 42 occurs.

Figure 4:
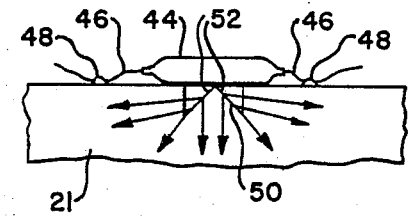
FIG. 4 illustrates one embodiment of the inver which facilitates dispersion of light from a small ir descent lamp throughout the area of the liquid cr display.

In order to disperse the light from the small point source comprising lamp 44 throughout the area of the liquid crystal display, an arrangement such as that shown in FIG. 4 may be employed. The lamp leads 46 are secured to the top of the display by spots or patches 48 of an epoxy cement. Directly beneath the lamp 44 is a notched area 50 which, in FIG. 4, forms the general configuration of a W in the plexiglas plate 21. With an arrangement of this sort, some of the light from lamp 44 will pass directly ahead; while the remainder will be reflected from the portions 52 of the W configuration to the right and left, thus evenly dispersing the light throughout the plate 21.

Figure 5:
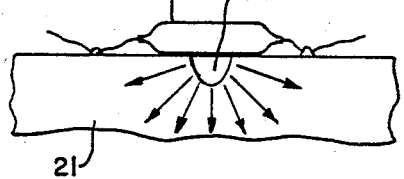
FIG. 5 illustrates another embodiment of the ir tion for dispersing light throughout the area of the uid crystal display.

In FIG. 5, another embodiment of the invention is shown which is similar to that of FIG. 4 except that in this case the notch 54 in plate 21 is generally parabolic in configuration. It is, however, preferred to have the configuration of FIG. 4 wherein the light is reflected from edges of the notched slot.

As shown in FIG. 3, the reflecting surface 36 may comprise a foil or the like which is bent around the lamp 44 as at 56 to provide a back reflector for the lamp. Additionally, the reflective foil may project downwardly and cover the gasket 30 such that it will not absorb light.

Figure 6:
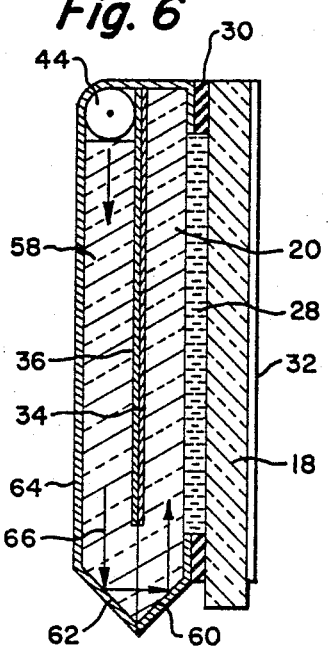
FIG. 6 illustrates another embodiment of the ir tion.

In FIG. 6, another embodiment of the invention is shown wherein there is provided, behind the polarizer 34 and reflector 36, a second transparent plate 58. Plate 58 may comprise plexiglas or any other suitable transparent material. At one end of plate 58 is the lamp 44; while the opposite ends of the plates 20 and 58 are beveled as at 60 and 62. By providing a reflective film 64 on the back of the plate 58, around the lamp 44, and around the beveled surfaces 60 and 62, light from the lamp 44 can be made to pass along the direction of arrows 58, be reflected from the reflective material on beveled surfaces 60 and 62, and then be directed in the opposite direction along the length of the plate 20, giving an even distribution of light.

In FIGS. 7 and 8, an alternative configuration of the plexiglas plate 21 is shown. In this case, the lamp 44 is molded directly into the plate 21 and surrounded by reflective material 70 forming the rear reflector 36. Formed in the plate 21 are a series of aluminized baffles or slots which act as light pipes. Directly beneath the lamp 44 is a baffle 72 which blocks light and reflects it to two angled, aluminized baffles 74 which act to scatter the light. Aluminized grooves 76 (see also FIG. 8) direct the light to aluminized beveled portions 78 at the corners of the plate 21. Here, some of the light is directed into the interior of the plate and some is transmitted through aluminized grooves 80 at the sides of the plate to beveled portions 82 where the same process is repeated with part of the light being reflected into the interior of the plate and the remainder being transmitted through grooves 84 to beveled, aluminized surfaces 86 formed by a notch 88. In this manner, it can be seen that light from the point source or lamp 44 is transmitted to a series of points spaced throughout the plate each of which reflects a small portion of the total light into the interior of the plate to produce an even dispersion.

In the case where dichroic films are used on the facing surfaces of plates 18 and 20, the plexiglas plate 21 can be eliminated, in which case the light will be dispersed throughout the rear plate 20.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A liquid crystal horological instrument includ display comprising a layer of liquid crystal ma sandwiched between transparent parallel plates, t parent conductive patches on the plates adapte form numerals when a source of potential is ap across selected ones of the patches, light refle means on the side of the display opposite that whi viewed by an observer of the horological instrur means for illuminating said display in the absen ambient light, said latter-mentioned neans compr a single electric lamp extending along an edge o display, the lamp being shorter than the edge of th play and being positioned substantially midway tween the edges of the display such that the lamp, out any dispersing means, will illuminate only the tral portion of the display, a source of power fo lamp, and means for dispersing light produced by lamp throughout substantially the entire area of light reflective means.

2. The horological instrument of claim 1 wherein light reflective means will scatter polarized light out depolarizing the same.

3. The horological instrument of claim 1 wherein for dispersing light produced by said lamp means prises a notch formed in a transparent plate.

4. The horological instrument of claim 3 wherein notch is in the form of W providing reflecting sur for reflecting light from said lamp to either side c lamp.

5. The horological instrument of claim 3 wherein notch is parabolic in configuration.

6. The horological instrument of claim 1 includ transparent plate between the light reflective n and one of said first-mentioned transparent pa plates, said means for dispersing light being inc rated into said latter-mentioned plate.

7. The horological instrument of claim 6 wherein means for dispersing light comprises light pipes fo in said latter-mentioned plate.

8. A liquid crystal horological instrument incluc display comprising a layer of liquid crystal ma sandwiched between transparent parallel plates, t parent conductive patches on the plates adapte form numerals when a source of potential is ap across selected ones of the patches, reflective mea the side of the display opposite that which is view an observer of the horological instrument, mear illuminating said display in the absence of am light, said latter-mentioned means comprising an tric lamp positioned adjacent an edge of the disp source of power for the lamp, switch means inc rated into said horological instrument for selec connecting the lamp to the source of power, mea cluding a crystal oscillator, a counter and drivin cuitry for said display, means for permanently cor ing said oscillator, said counter and said drivin cuitry to said source of power whereby the source prises a single source of power for both the lamp a as the electrical circuitry for driving said displa display being energized continually, and means fc persing light produced by said lamp throughou stantially the entire area of said light reflective n 9. The horological instrument of claim 1 wherei lamp is rated at about 1 ½ volts and about 16 mi peres.

* * * * *

UNITED STATES PATENT OFFICE
CERTIFICATE OF CORRECTION

PATENT NO. : 3,864,905
DATED : February 11, 1975
INVENTOR(S) : KENNETH J. RICHARDSON It is certified that error appears in the above-identified patent and that said Letters Patent are hereby corrected as shown below:

Column 6, claim 3, line 24, the word "means" appearing after "lamp" belongs before "for".

Column 6, claim 4, line 27, "the form of W" should be --the form of a "W"--

Signed and Sealed this

Fourteenth Day of September 1976

[SEAL]

Attest:

RUTH C. MASON
Attesting Officer

C. MARSHALL DANN
Commissioner of Patents and Trademarks